United States Patent [19]
Baker et al.

[11] Patent Number: 5,879,431
[45] Date of Patent: Mar. 9, 1999

[54] ETHYLENE/NITROGEN SEPARATION PROCESS

[75] Inventors: Richard W. Baker, Palo Alto; Kaaeid A. Lokhandwala, Union City; Ingo Pinnau, Palo Alto, all of Calif.

[73] Assignee: Membrane Technology and Research, Inc., Menlo Park, Calif.

[21] Appl. No.: 907,187

[22] Filed: Aug. 6, 1997

Related U.S. Application Data

[62] Division of Ser. No. 608,743, Feb. 29, 1996, Pat. No. 5,669,958.

[51] Int. Cl.⁶ .................................................. B01D 53/22
[52] U.S. Cl. .......................... 95/50; 95/41; 95/42; 95/96; 95/238
[58] Field of Search .................................. 95/39, 41, 42, 95/45, 50, 92, 96, 143, 149, 237–240

[56] References Cited

U.S. PATENT DOCUMENTS

| | | | |
|---|---|---|---|
| 2,617,493 | 11/1952 | Jones | 95/50 X |
| 3,307,330 | 3/1967 | Niedzielski et al. | 95/45 |
| 4,374,657 | 2/1983 | Schendel et al. | 62/19 |
| 4,511,382 | 4/1985 | Valencia et al. | 62/20 |
| 4,529,411 | 7/1985 | Goddin, Jr. et al. | 55/16 |
| 4,553,983 | 11/1985 | Baker | 55/16 |
| 4,595,405 | 6/1986 | Agrawal et al. | 62/18 |
| 4,599,096 | 7/1986 | Burr | 62/27 |
| 4,602,477 | 7/1986 | Lucadamo | 62/24 |
| 4,623,704 | 11/1986 | Dembicki et al. | 526/68 |
| 4,639,257 | 1/1987 | Duckett et al. | 55/16 |
| 4,654,063 | 3/1987 | Auvil et al. | 62/18 |
| 4,681,612 | 7/1987 | O'Brien et al. | 62/23 |
| 4,687,498 | 8/1987 | Maclean et al. | 62/17 |
| 4,689,062 | 8/1987 | Maclean et al. | 62/18 |
| 4,755,193 | 7/1988 | Higashimura et al. | 55/16 |
| 4,772,295 | 9/1988 | Kato et al. | 95/50 |
| 4,783,203 | 11/1988 | Doshi | 95/50 |
| 4,793,841 | 12/1988 | Burr | 62/27 |
| 4,857,078 | 8/1989 | Watler | 55/16 |
| 4,936,887 | 6/1990 | Waldo et al. | 62/24 |
| 4,963,165 | 10/1990 | Blume et al. | 55/16 |
| 4,994,094 | 2/1991 | Behling et al. | 55/16 |
| 5,013,338 | 5/1991 | Anand et al. | 55/158 |
| 5,071,451 | 12/1991 | Wijmans | 55/16 |
| 5,089,033 | 2/1992 | Wijmans | 55/16 |
| 5,199,962 | 4/1993 | Wijamans | 55/16 |
| 5,205,843 | 4/1993 | Kaschemekat et al. | 95/16 |
| 5,256,296 | 10/1993 | Baker et al. | 210/640 |
| 5,281,255 | 1/1994 | Toy et al. | 96/50 |
| 5,332,424 | 7/1994 | Rao et al. | 95/50 X |
| 5,352,272 | 10/1994 | Moll et al. | 96/9 |
| 5,374,300 | 12/1994 | Kaschemekat et al. | 95/39 |
| 5,378,263 | 1/1995 | Prasad | 95/45 X |
| 5,414,190 | 5/1995 | Förg et al. | 585/802 |
| 5,452,581 | 9/1995 | Dinh et al. | 62/24 |
| 5,501,722 | 3/1996 | Toy et al. | 95/50 |
| 5,669,958 | 9/1997 | Baker et al. | 95/50 |

OTHER PUBLICATIONS

Gottschlich et al., "Energy Minimization of Separation Processes using Conventional Membrane/Hybrid Systems," Final Report to DOE, 1990.

Tanaka et al., "Permeability and Permselectivity of Gases in Fluorinated and Non–Fluorinated Polyimides," Polymer, vol. 33, p. 585, 1992.

Coleman et al., "The Transport Properties of Polyimide Isomers Containing Hexafluoroisopropylidene in the Diamine Residue," J. Memb. Sci., vol. 50, p. 1915, 1990.

Kim et al., "Relationship Between Gas Separation Properties and Chemical Structure in a Series of Aromatic Polyimides," J. Memb. Sci., vol. 37, p. 45, 1988.

Stern et al., "Structure–Permeability Relationships in Silicone Polymers," J. Polymer Sci., vol. 25, p. 1263, 1987.

Koros et al., "Sorption and Transport of Various Gases in Poly–Carbonate," J. Memb. Sci., vol. 2, p. 165, 1977.

Plate et al., "Gas and Vapor Permeation and Sorption in Poly (trimethylsilylpropyne)," J. Memb. Sci., vol. 60, p. 13, 1991.

Baker et al., "Nitrogen Separation from Natural Gas Using Membranes," Presented to AIChE, Houston, TX, Feb. 1993.

Toy et al., "Gas Transport Through Poly(1–Trimethylsilyl–1–Propyne) Membranes in the Presence of Organic Vapors," Presented at NAMS, Breckenridge, CO, May 1994.

Pinnau, "Membrane Material Selection for the Separation of Condensable Gases," Presented at GKSS Research Center, Sep. 1995.

Pinnau et al., "Poly(1–Trimethylsilyl–1–Propyne)–Superglassy Polymer w/ Extraordinary Properties for Sep. of Organic Vapors from Permanent Gases," Presented at NAMS, Portland, OR, May 1995.

R.W. Baker and M. Jacobs, "Improve Monomer Recovery from Polyolefin Resin Degassing," Hydrocarbon Processing, Mar. 1996.

*Primary Examiner*—Robert Spitzer
*Attorney, Agent, or Firm*—J. Farrant

[57] ABSTRACT

A membrane separation process for treating a gas stream containing methane and nitrogen, for example, natural gas. The separation process works by preferentially permeating methane and rejecting nitrogen. We have found that the process is able to meet natural gas pipeline specifications for nitrogen, with acceptably small methane loss, so long as the membrane can exhibit a methane/nitrogen selectivity of about 4, 5 or more. This selectivity can be achieved with some rubbery and super-glassy membranes at low temperatures. The process can also be used for separating ethylene from nitrogen.

18 Claims, 11 Drawing Sheets

ETHYLENE/NITROGEN SEPARATION PROCESS

This application is a divisional application of Ser. No. 08/608,743, filed Feb. 29, 1996, now U.S. Pat. No. 5,669,958.

FIELD OF THE INVENTION

The invention is a gas separation membrane process for separating ethylene from nitrogen.

BACKGROUND OF THE INVENTION

Fourteen percent of known U.S. natural gas reserves contain more than 4% nitrogen. The bulk of these reserves cannot be exploited because no economical technology for removing the nitrogen exists.

Cryogenic distillation is the only process being used to date on any scale to remove nitrogen from methane in natural or associated gas. Twelve such plants are believed to be in operation in the U.S., for example in enhanced oil recovery, where nitrogen is used to pressurize the formation and tends to build up in the associated gases removed with the oil. The gas streams that have been treated by cryogenic separation contain relatively large amounts of nitrogen, such as more than 10 vol %. Cryogenic plants can be cost effective in these applications because all the separated products have value. The propane, butane and heavier hydrocarbons can be recovered as natural gas liquids (NGL), the methane/ethane stream can be delivered to the gas pipeline and the nitrogen can be reinjected into the formation.

Cryogenic plants are not used more widely because they are expensive and complicated. A particular complication is the need for significant pretreatment to remove water vapor, carbon dioxide, and $C_{3+}$ hydrocarbons and aromatics to avoid freezing of these components in the cryogenic section of the plant, which typically operates at temperatures down to $-150°$ C. The degree of pretreatment is far more elaborate and the demands placed upon it are far more stringent than would be required to render the gas acceptable in the pipeline grid absent the excess nitrogen content. For example, pipeline specification for water vapor is generally about 120 ppm; to be fit to enter a cryogenic plant, the gas must contain no more than 1–2 ppm of water vapor at most. Similarly, 2% carbon dioxide content may pass muster in the pipeline, whereas carbon dioxide may be present only at the level of 100 ppm or less for cryogenic separation.

Other processes that have been considered for performing this separation include pressure swing adsorption and lean oil absorption; none is believed to be in regular industrial use.

Gas separation by means of membranes is known. For example, numerous patents describe membranes and processes for separating oxygen or nitrogen from air, hydrogen from various gas streams and carbon dioxide from natural gas. Such processes are in industrial use, using glassy membranes. Rubbery membranes are used to separate organic components from air or other gas mixtures, such as in resource recovery and pollution control.

It is also known to combine membrane separation with cryogenic distillation. For example, the following U.S. Pat. Nos. show such processes for the separation of carbon dioxide from methane: 4,529,411; 4,511,382; 4,639,257; 4,599,096; 4,793,841; 4,602,477; 4,681,612; 4,936,887 and 5,414,190. U.S. Pat. No. 4,374,657 shows a combination of cryogenic distillation and membrane separation for separating ethane from carbon dioxide. U.S. Pat. No. 4,654,063 shows cryogenic separation followed by membrane separation for separating hydrogen from other gases. U.S. Pat. No. 4,595,405 shows a similar arrangement for separation of nitrogen and oxygen from air. U.S. Pat. Nos. 4,687,498 and 4,689,062 show process designs combining membrane separation and cryogenic distillation for recovery of argon from ammonia plant purge gas mixtures.

A report by SRI to the U.S. Department of Energy ("Energy Minimization of Separation Processes using Conventional Membrane/Hybrid Systems", D. E. Gottschlich et al., Final Report under Contract number DE 91-004710, 1990) suggests that separation of nitrogen from methane might be achieved by a hybrid membrane/pressure swing adsorption system. The report shows and considers several designs, assuming that a hypothetical nitrogen-selective membrane, with a selectivity for nitrogen over methane of 5 and a transmembrane methane flux of $1\times10^{-6}$ $cm^3(STP)/cm^2 \cdot s \cdot cmHg$, were to become available, which to date it has not.

In fact, there are several difficulties associated with separating nitrogen from methane by means of membranes, the main one being the absence of membranes with a useful selectivity. Both glassy and rubbery membranes have poor selectivities for nitrogen over methane or methane over nitrogen. Table 1 lists some representative values.

TABLE 1

| Polymer | Permeability (Barrer) | | Selectivity (-) | | Ref. |
| --- | --- | --- | --- | --- | --- |
| | $N_2$ | $CH_4$ | $N_2/CH_4$ | $CH_4/N_2$ | |
| Polyimide (6FDA-mp'ODA) | 0.26 | 0.13 | 2.1 | 0.5 | 1 |
| Polyimide (6FDA-BAHF) | 3.10 | 1.34 | 2.3 | 0.4 | 1 |
| Polyimide (6FDA-IPDA) | 1.34 | 0.70 | 1.9 | 0.5 | 2 |
| Polyimide (6FDA-MDA) | 0.20 | 0.10 | 2.0 | 0.5 | 3 |
| Cellulose acetate | 0.35 | 0.43 | 0.8 | 1.2 | 4 |
| Polycarbonate | 0.37 | 0.45 | 0.8 | 1.2 | 4 |
| Polysulfone | 0.14 | 0.23 | 0.6 | 1.7 | 4 |
| Poly (dimethylsiloxane-dimethylstyrene) | 103 | 335 | 0.3 | 3.3 | 4 |
| Poly(dimethylsiloxane) | 230 | 760 | 0.3 | 3.3 | 4 |
| Poly(siloctylene-siloxane) | 91 | 360 | 0.25 | 4.0 | 5 |
| Poly(p-silphenylene-siloxane) | 3 | 12 | 0.25 | 4.0 | 5 |
| Polyamide-polyether copolymer | 4.8 | 20 | 0.24 | 4.2 | 4 |

1 Barrer = $10^{-10}$ $cm^3(STP) \cdot cm/cm^2 \cdot s \cdot cmHg$

References for table:
1. K. Tanaka, H. Kita, M. Okano, and K. Okamoto, "Permeability and Permselectivity of Gases in Fluorinated and Non-fluorinated Polyimides," *Polymer* 33, 585 (1992).
2. M. R. Coleman and W. J. Koros, "Isomeric Polyimides Based on Fluorinated Dianhydrides and Diamines for Gas Separation Applications," *J. Memb. Sci.* 50, 285 (1990).
3. T. H. Kim, W. J. Koros, C. R. Husk, and K. C. O'Brien, "Relationship Between Gas Separation Properties and Chemical Structures in a Series of Aromatic Polyimides," *J. Memb. Sci.* 37, 45 (1988).
4. J. G. Wijmans, "Membrane Processes and Apparatus for Removing Vapors from Gas Streams," U.S. Pat. No. 5,071,451 (December 1991).
5. S. A. Stern, V. M. Shah, and B. J. Hardy, "Structure Permeability Relationships in Silicone Polymers," *J. Polymer Sci: Polymer Physics Ed.* 25, 1263, (1987).

These separation properties are not good enough to make membrane separation practical for this gas pair. With a nitrogen-selective membrane, we have calculated that a nitrogen/methane selectivity of about 15 is needed for a practical process that achieves adequate nitrogen removal and at the same time that avoids losing excessive amounts of methane into the permeate stream.

U.S. Pat. No. 5,352,272, to Dow Chemical, concerns operation of glassy membranes at subambient temperatures to improve selectivity for one gas over another. To achieve an acceptable selectivity for nitrogen over methane using known membrane materials would need an increase over the room-temperature selectivities shown in Table 1 of at least five-fold and more probably seven-fold or eight-fold. It is probable that the methane in the stream would liquefy before a low enough temperature to achieve this selectivity could be reached. Also, in glassy membranes, permeability, which is dominated by the diffusion coefficient, declines with decreasing temperature, so permeabilities, already low, would rapidly decline to an unacceptably low value.

Membrane separations are usually driven by a pressure difference between the feed and permeate sides, the feed side being at high pressure with respect to the permeate side. With a methane-selective membrane, if the bulk of the gas stream being treated has to pass to the permeate low-pressure side, then be recompressed, it is to be expected that this would make for an inefficient and hence costly process. Likewise, the membrane area that is needed to perform the separation is in proportion to the amount of gas that must cross the membrane; if most of the gas in the feed has to permeate the membrane, a much larger membrane area will be needed than if only a few percent of the feed gas has to permeate.

Thus, the separation of nitrogen from methane by means of membranes is a very difficult problem and has not, to applicants' knowledge, been previously attempted, either as a stand-alone operation or in conjunction with other separation techniques.

Similar problems are encountered in the separation of ethane from nitrogen, such as during natural gas processing or in the chemical industry, and in the separation of ethylene from nitrogen, such as during polymer manufacture.

SUMMARY OF THE INVENTION

The invention is a membrane separation process for treating a gas stream containing methane and nitrogen, the gas stream typically, but not necessarily, being natural gas. The separation process of the invention comprises:
(a) providing a membrane having a feed side and a permeate side and being selective for methane over nitrogen;
(b) passing the gas stream to be treated across the feed side of the membrane at a temperature at which the membrane exhibits the target selectivity for methane over nitrogen;
(c) withdrawing from the feed side a residue stream depleted in methane and enriched in nitrogen compared with the raw gas stream;
(d) withdrawing from the permeate side a permeate stream enriched in methane and depleted in nitrogen compared with the raw gas stream.

Thus, the process of the invention works by preferentially permeating methane and rejecting nitrogen, that is, usually the major component of the stream is permeated and the minor component is rejected. Unexpectedly, we have found that the process is able to meet natural gas pipeline specifications for nitrogen, with only a small methane loss, and, despite the need to recompress the methane-rich permeate, is cost effective.

To achieve useful separation results, the membranes should preferably exhibit a methane/nitrogen selectivity of at least about 4, more preferably about 5 or more. We have found that such a target selectivity can be achieved for rubbery materials by cooling, preferably down to no more than about −50° C. Furthermore, this selectivity is accompanied by high methane transmembrane flux, such as at a very minimum at least about $1\times10^{-6}$ $cm^3(STP)/cm^2 \cdot s \cdot cmHg$, preferably at least $1\times10^{-5}$ $cm^3(STP)/cm^2 \cdot s \cdot cmHg$ and more preferably at least $1\times10^{-4}$ $cm^3(STP)/cm^2 \cdot s \cdot cmHg$.

The process of the invention can be carried out with two types of membranes. The first is rubbery membranes. The second is membranes made from the so-called "super-glassy" polymers, defined and described in the Detailed Description of the Invention below, that exhibit anomalous behavior for glassy materials in that they preferentially permeate larger, more condensable molecules over smaller, less condensable molecules.

Preferably, at least a portion of the cooling required to produce adequate selectivity is obtained by expanding the reject nitrogen stream and using this to chill the incoming feed stream. The methane/nitrogen separation process may be carried out in one or multiple membrane stages and the membrane separation may be augmented by other nitrogen/methane separation techniques, such as absorption, adsorption or distillation.

Natural gas streams to be treated by the process of the invention may, and frequently do, include other components, such as $C_{3+}$ hydrocarbons, aromatic hydrocarbons, water vapor, carbon dioxide and hydrogen sulfide. The gas stream to be separated may be subjected to any known treatments upstream or downstream of the membrane process, including but not limited to other membrane separation steps, for removing these contaminants to desired levels.

One particular advantage of the invention, however, is that the membranes used are not damaged by water or hydrocarbons. This gives greater flexibility of process design and in some cases may simplify the number of steps required in the total treatment train.

It is an object of the invention to provide membrane processes for separation of nitrogen from methane.

It is an object of the invention to provide membrane processes for separation of nitrogen from methane with little methane loss in the nitrogen stream.

It is an object of the invention to provide membrane processes for separation of nitrogen from methane with high transmembrane methane flux.

It is an object of the invention to provide membrane processes for separation of nitrogen from methane that can withstand the presence of secondary contaminants in the feed gas stream.

Additional objects and advantages will be apparent from the description of the invention to those skilled in the gas separation arts.

In another aspect, the invention can be used as a process for separating ethylene from nitrogen. In the case of ethylene separation from nitrogen, the process will then comprise:
(a) providing a membrane having a feed side and a permeate side and being selective for ethylene over nitrogen;
(b) passing the gas stream to be treated across the feed side of the membrane at a temperature at which the membrane exhibits the target selectivity for ethylene over nitrogen;
(c) withdrawing from the feed side a residue stream depleted in ethylene and enriched in nitrogen compared with the raw gas stream;
(d) withdrawing from the permeate side a permeate stream enriched in ethylene and depleted in nitrogen compared with the raw gas stream.

DETAILED DESCRIPTION OF THE INVENTION

Figure 1:
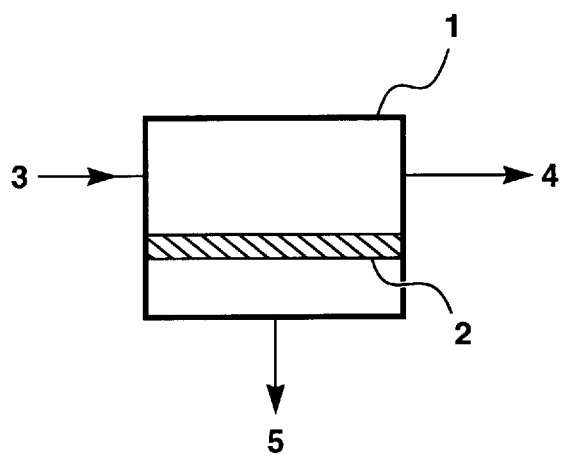
FIG. 1 is a schematic drawing illustrating the process of the invention in its most basic form.

As used herein, gas means gas or vapor.

As used herein, $C_{3+}$ hydrocarbon means a straight-chain or branched chain saturated or unsaturated hydrocarbon having three or more carbon atoms.

The invention is a membrane separation process for treating a gas stream containing methane and nitrogen. In its most basic aspect, the invention involves running a feed stream containing these components across the feed side of a membrane that is selective in favor of methane over nitrogen. A driving force for transmembrane permeation is provided by a superatmospheric pressure on the feed side, a subatmospheric pressure on the permeate side, or both.

A residue stream depleted in methane and enriched in nitrogen compared with the feed is withdrawn from the feed side of the membrane. A permeate stream enriched in methane and depleted in nitrogen is withdrawn from the permeate side.

Loss of methane can be an important factor in natural gas processing. On the one hand, pipeline grade methane is frequently the desired product, and substantial losses of product have an adverse effect on process economics. On the other hand, large quantities of methane in the non-product stream may make further handling, use or treatment of this stream difficult. As a general rule, therefore, the gas industry is concerned about methane losses during processing and prefers to keep these losses as low as possible. What constitutes an acceptable loss varies, depending on many economic and technical factors. As a general rule, a loss greater than 50% is seldom acceptable, and a much lower loss is desirable such as below 25%, below 10% or below 5% in some cases.

The amount of nitrogen that is acceptable in the methane product stream depends on the destination of the methane. Natural gas pipeline specification is typically no more than 4% total inerts, so depending on the other constituents, this means no more than about 4% nitrogen, but perhaps no more than 2% or 3% nitrogen, for example, if carbon dioxide, helium, argon or other constituents are also present. If purer methane is required, the target nitrogen content may obviously be lower. If the gas stream can be diluted with a supply of clean gas, higher nitrogen levels may be acceptable, for example up to about 8% nitrogen.

The process of the invention works by preferentially permeating methane and rejecting nitrogen. For natural gas processing, this is unusual, and at first sight unattractive, because the major component of the stream is permeated and the minor component is rejected. Thus, the stage cut and membrane area needed to carry out the process are relatively large. Also, the methane-enriched stream is recovered from the membrane at low pressure and will often need recompression to pipeline pressure. We have discovered that, despite these apparent disadvantages, the process is able to meet natural gas pipeline specifications for nitrogen. Furthermore, pipeline grade methane can be obtained with an acceptably small methane loss in the reject nitrogen stream. Also, despite the need to recompress the methane-rich permeate for some applications, the process can be made economically attractive compared with other separation options.

The membrane separation step relies on being able to achieve a selectivity, in gas mixtures, of at least about 4, more preferably at least about 5, yet more preferably at least about 5.5 or most preferably at least about 6 or more for methane over nitrogen. Most membranes that have been used in the past in the gas industry, such as cellulose acetate membranes for removing carbon dioxide from methane, are not suitable. Neither are any other conventional glassy membranes, which exhibit slight selectivity in favor of nitrogen over methane.

To our knowledge, there are no reports of membrane materials being able to achieve these target mixed gas methane/nitrogen selectivities at room temperature (20° C.).

Without wishing to be bound by theory, we believe our invention can best be understood starting from a brief theoretical explanation of permeation in polymer materials. A synthetic polymer membrane separates the components of a gas or vapor mixture because the components permeate the membrane at different rates. The permeability, P [cm$^3$(STP) ·cm/cm$^3$·s·cmHg], of a polymer membrane material for a gas is defined as the rate at which that gas moves through a standard thickness [1 cm] of the material under a standard driving force [a pressure difference of 1 cmHg]. A measure of the ability of a membrane to separate two gases is the selectivity, α, defined as the ratio of the gas permeabilities, $P_1/P_2$ Selectivity can also be expressed as:

$$\alpha = \frac{D_1}{D_2} \cdot \frac{k_1}{k_2}$$

where D is the diffusion coefficient of the gas in the membrane [cm$^2$/s], which is a measure of the gas mobility, and k is the Henry's law sorption coefficient, which links the concentration of the gas in the membrane material to the pressure in the adjacent gas [cm$^3$(STP)/cm$^3$·cmHg]. The intrinsic selectivity of a polymer material is established by measuring the permeabilities with pure gas or vapor samples, then calculating the ratio. The actual selectivity obtained in a real separation process is established by making permeation measurements with gas mixtures.

The ratio $D_1/D_2$ is the ratio of the diffusion coefficients of the two gases and can be viewed as the mobility selectivity, reflecting the different sizes of the two molecules. The ratio $k_1/k_2$ is the ratio of the Henry's law solubility coefficients of the two gases and can be viewed as the solubility selectivity, reflecting the relative condensabilities of the two gases.

In all polymer materials, the diffusion coefficient decreases with increasing molecular size. Hence, the mobility component of the selectivity always favors the passage of small molecules over large ones. The solubility component of the selectivity, on the other hand, is a measure of the energy required for sorption and normally increases with molecular diameter, because larger molecules are normally more condensable than smaller ones. The combined effect of these two factors determines the selectivity of the membrane.

The balance between mobility selectivity and solubility selectivity is different for glassy and rubbery polymers. In glassy polymers, the diffusion term is usually dominant, permeability falls with increasing permeant size and the material is selective for small molecules over large ones. In rubbery polymers, the solubility term is usually dominant, permeability increases with increasing permeant size and the material is selective for large molecules over smaller ones. The molecular kinetic diameters of nitrogen (3.64 Å) and methane (3.8 Å) are similar, and methane has a critical temperature of −82.6° C., so is only moderately more soluble than nitrogen in most polymer materials. The slightly smaller molecular size of nitrogen means that glassy materials slightly favor the passage of nitrogen over methane. The relative condensability of methane means that rubbery materials slightly favor the passage of methane over nitrogen. As a result of the similar molecular sizes and the poor condensability of both components, however, both glassy and rubbery membrane materials have poor selectivity for this gas pair, as was illustrated in Table 1.

However, we have found that, with cooling, our target methane/nitrogen selectivity of about 4, 5 or more is obtainable with gas mixtures in certain rubbery polymer membranes. In addition, we have found that such selectivities can be accompanied by usefully high transmembrane methane fluxes, such as at a very minimum at least about $1\times10^{-6}$ cm$^3$(STP)/cm$^2$·s·cmHg, preferably at least $1\times10^{-5}$ cm$^3$(STP)/cm$^2$·s·cmHg and more preferably at least $1\times10^{-4}$ cm$^3$(STP)/cm$^2$·s·cmHg.

Types of rubbers for making membranes for use in the invention are, therefore, those that can reach the target of a mixed gas methane/nitrogen selectivity of at least about 4, more preferably at least about 5, combined with a transmembrane methane flux of at least about $1\times10^{-6}$ cm$^3$(STP)/cm$^2$·s·cmHg at an appropriate temperature.

As can be seen from the brief explanation of the solution/diffusion transport mechanism above, it is important that the material to be used remains rubbery under the temperature conditions at which it is used, so that the separation remains dominated by the sorption or solubility term. As the temperature is reduced from 20° C., rubbery membranes at first become more methane selective with falling temperature. The transmembrane fluxes of both gases fall, but the loss in methane flux is small compared with the loss in nitrogen flux, so that the selectivity increases. As the temperature is decreased further, the membrane material begins to lose flexibility and the balance of the sorption and diffusion components of the selectivity shifts in favor of the diffusion term, so that the material now becomes less methane-selective, rather than more, as the temperature falls. In some materials the properties may alter to such an extent that the material becomes nitrogen-selective, even considerably above the nominal glass-transition temperature. Thus, the operating temperature of the invention should preferably be at least 30° C. above the glass-transition temperature of the rubbery membrane material, more preferably at least 40° C. above and most preferably at least 50° C. or more above.

On the other hand, since it is the difference between the sorption of methane and nitrogen that provides the selectivity, it is desirable to take advantage of a low operating temperature to enhance this difference.

Considering the need to balance these two contradictory factors, our preferred appropriate operating temperature for the process of the invention is between 0° C. and −100° C., more preferably between about −10° C. and −80° C. and most preferably between about −20° C and −70° C. Specifically we prefer to operate, where possible, at temperatures no lower than about −40° C., −50° C., −60° C. or −70° C. The choice of operating temperature is influenced to some extent, of course, by the particular transport properties of the membrane material used.

The preferred rubbers for making membranes for use in the invention are those that meet the selectivity and flux targets and that have a glass transition temperature ($T_g$) at 1 atmosphere pressure of below −50° C., more preferably below −80° C. and most preferably below −100° C.

Specific, but non-limiting, preferred rubbery materials that we have found to be within the scope of this definition include siloxane polymers, particularly the polymers having a repeating unit having the structure:

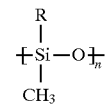

wherein R is an alkyl group having one to eight carbon atoms and n is a positive integer. These have glass transition temperatures approximately as follows:

| | |
|---|---|
| Poly(dimethylsiloxane) | −123° C. |
| Poly(methlethylsiloxane) | −135° C. |
| Poly(methylpropylsiloxane) | −120° C. |
| Poly(methylhexylsiloxane) | −108° C. |
| Poly(methyloctylsiloxane) | −92° C. |

Amongst these, particularly preferred are poly (dimethylsiloxane), that is, silicone rubber, and poly (methyloctylsiloxane). Poly(methylphenylsiloxane) may also be used. Other rubbers that we expect to be useful include those listed in Table 1, specifically poly (dimethylsiloxane-dimethylstyrene) poly(siloctylene-siloxane) and poly(p-silphenylene-siloxane). Yet other rubbers include polymethylene, poly (dimethylsilylenemethylene), cis-poly(1-butylene), poly (dimethoxyphosphazene), poly(octadecylmethacrylate) and poly(oxytetramethylenedithiotetramethylene), all of which have glass transition temperatures in the range −70° C. to −110° C. Yet other rubbers that may be useful include methylene-ethylene copolymers having glass transition temperatures around −100° C., polyisoprene, polybutadiene and natural rubber.

Usually, rubbery materials do not have enough mechanical strength to be formed as unsupported membranes. Therefore, preferred embodiments incorporating rubbery selective materials involve the use of a composite membrane comprising a microporous support, onto which the rubbery selective layer is deposited as a thin coating. The preparation of such membranes is well known in the membrane-making art. It is commonly thought that rubbery composite membranes do not withstand high-pressure operation well, and to date, such membranes have not been generally used in natural gas treatment, where feed gas pressures are often as high as 500 psig or 1,000 psig. We have found, however, that composite membranes, with thin enough rubbery selective layers to provide adequate transmembrane methane flux, can be used satisfactorily at high feed pressures and not only maintain their integrity but continue to exhibit adequate selectivity for methane over nitrogen.

A second type of membrane that we have found to be useful for the process of the invention is formed from the so-called "super-glassy" polymers. These materials are characterized by having a rigid structure, high glass transition temperatures, typically above 100° C., 200° C. or higher, and unusually high free volume within the polymer material, such as more than 10%, more than 20% or even as high as 25% or more (as estimated from vapor solubility data according to the method of W. J. Koros et al., J. Membrane Science, Vol. 2, page 165, 1977). In contrast, conventional glassy polymers typically have free volumes within the polymer itself of a few percent, such as 3% for polycarbonate, or 6% for polyphenylene oxide. Super-glassy materials useful for carrying out the invention exhibit unusual behavior for glassy materials in that they preferentially permeate larger, more condensable molecules over smaller, less condensable molecules, so that they are selective, albeit slightly at room temperature, for methane over nitrogen. Super-glassy materials useful for carrying out the invention are further characterized in that they have a high methane permeability at room temperature, by which we mean a permeability of at least about 1,000 Barrer.

Without wishing to be bound by theory, we believe that certain of the high-free-volume, glassy polymers are useful in our invention because their permeation properties are not governed by solution/diffusion (the mechanism of gas transport in conventional, low-free-volume polymers), but are more akin to transport in microporous polymers.

If numerical values for free volume, glass transition temperature and/or methane permeability are not to hand, therefore, a simple, first-pass screening technique to identify likely high-free-volume glassy polymers for carrying out our invention is to examine the oxygen/nitrogen permeability data. Such data are much more readily available for many materials than methane permeability data, and will enable potential candidate materials to be rapidly identified. We believe materials with the required structure to meet the demands of our invention will normally have oxygen permeabilities at room temperature of at least about 500 Barrer (where 1 Barrer=$1 \times 10^{-10}$ cm$^3$(STP)·cm/cm$^2$·s·cmHg), and oxygen/nitrogen selectivity at room temperature of no more than about 2.5.

The best known of the super-glassy materials, representative of the class and useful in our invention, is polytrimethylsilylpropyne (PTMSP), which has a free volume of about 25% according to the above-mentioned method. Although PTMSP is rigid and glassy, up to at least about 200° C., it exhibits an oxygen permeability of 10,000 Barrer or above, more than 15 times higher than that of silicone rubber, previously the most permeable polymer known. The selectivity for oxygen/nitrogen, however, is low (1.5–1.8). The high permeability appears to be associated with an unusually high free-volume within the polymer material, and has been confirmed with many examples of pure gases and vapors, including oxygen, nitrogen, hydrogen, helium, methane, ethane, propane, butane and higher hydrocarbons, sulfur hexafluoride and carbon dioxide. These pure-gas data suggest that PTMSP will exhibit poor selectivity for most gas separations. See for example, a paper by N. A. Platé et al. entitled "Gas and vapor permeation and sorption in poly(trimethylsilylpropyne)", Journal of Membrane Science, Vol. 60, pages 13–24, 1991.

We also found that permeation tests performed with pure gas samples of methane and nitrogen yielded low calculated ideal selectivities. We found, however, that the measured mixed-gas selectivity is slightly better, at about 2.5–3. Furthermore, we found that chilling the feed gas stream produced a substantial increase in selectivity, while maintaining good permeability. For example, chilling to −30° C. raised the mixed gas methane/nitrogen selectivity to about 5.5. This selectivity was obtained with a simulated natural gas stream containing 82% methane, 9% ethane, 3% propane, 1% butane and 5% nitrogen. As is discussed in more detail in co-owned U.S. Pat. No. 5,688,307, entitled "Separation of Low-Boiling-Point Gases using Super-Glassy Membranes", incorporated herein by reference in its entirety, we discovered unexpectedly that the presence of the heavier and more condensable $C_{3+}$ hydrocarbons actually increases the selectivity between less condensable or non-condensable components such as methane and nitrogen.

Non-limiting examples of the types of polymer materials useful for carrying out the processes of the invention include members of the following structure groups that also meet the above glass-transition temperature, free volume and permeation limits:

(i) Substituted acetylenes, having the general structural formula

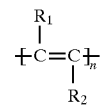

where $R_1$ and $R_2$ are independently hydrogen, a halogen, $C_6H_5$ or a linear or branched $C_1$–$C_4$ alkyl group and n is a positive integer.

(ii) Silicon-containing polyacetylenes, having the general structural formula

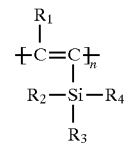

where $R_1$ is a linear or branched $C_1$–$C_4$ alkyl group, $R_2$ and $R_3$ are independently linear or branched $C_1$–$C_6$ alkyl groups, and $R_4$ is a linear or branched $C_1$–$C_{12}$ alkyl or aryl group and n is a positive integer.

(iii) Germanium-containing polyacetylenes, having the general structural formula

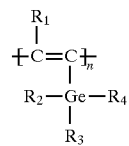

where $R_1$ is a linear or branched $C_1$–$C_4$ alkyl group, $R_2$ and $R_3$ are independently linear or branched $C_1$–$C_6$ alkyl groups, and $R_4$ is a linear or branched $C_1$–$C_{12}$ alkyl or aryl group and n is a positive integer.

(iv) Copolymers of any of the above with each other or with other polymer materials.

A particularly useful polymer material falling within the general definitions above is poly(trimethylsilylpropyne) (PTMSP), which has the structure:

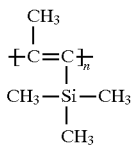

where n is a positive integer.

Membranes useful in the process of the invention may be formed from these glassy, high-free-volume materials in a variety of ways. Because the materials are glassy and rigid, an unsupported film of the polymer may be usable as a single-layer gas separation membrane. Alternatively, the membrane may be an integral asymmetric membrane, comprising a dense region that forms the separation membrane and a microporous support region. As a further alternative, the membrane may be a composite membrane comprising the separation membrane and an attached or unattached backing layer, or a composite membrane comprising a microporous support membrane of one polymer coated with the separation membrane of another polymer. We prefer to use composite membranes.

Whether rubbery or super-glassy membrane materials are used, membranes useful in the invention may be formed as flat sheets, hollow fibers or any other convenient form, and housed in any appropriate type of module, such as plate-and-frame, potted fiber or spiral-wound. Spiral-wound modules are a preferred choice.

The basic process of the invention is represented in simple form in the schematic drawing of FIG. 1. Referring now to this figure, membrane unit 1 contains a membrane 2 that exhibits a methane/nitrogen mixed gas selectivity of at least about 4, 5 or more under the operating conditions of the process. Feed stream 3, containing at least methane and nitrogen, passes across the feed side of the membrane. Residue stream 4, enriched in nitrogen and depleted in methane compared with stream 3, is withdrawn from the feed side. Permeate stream 5, enriched in methane and depleted in nitrogen compared with stream 3, is withdrawn from the permeate side. Transmembrane permeation occurs because permeate stream 5 is at a lower pressure than feed stream 3.

FIG. 1 shows a basic process in which a single bank of membrane modules is used. It will be appreciated by those of skill in the art that many arrangements of membrane modules are possible within the scope of the invention. For example, two-stage or multi-stage configurations, in which the permeate from one module or bank of modules is fed to the next stage, can be used if further processing of the first-stage permeate is required. Two-step or multi-step configurations, in which the residue from one module or bank of modules is fed to the next step, can be used if further processing of the first-step residue is required. Multi-stage and multi-step arrangements can also be combined.

Occasionally, the gas stream to be treated may already be at a temperature at which the desired selectivity is manifest, but in most cases the stream will need to be chilled. The cooling required to produce adequate selectivity can be obtained by any convenient method known to the art. Typically, but not necessarily, cooling will involve heat exchange by running the feed gas stream to the membrane unit in indirect contact against a colder fluid.

It is preferred if heat integration can be practiced, such as by using at least a portion of the residue or permeate streams, or both, to cool or partially cool the incoming feed. The nitrogen-enriched residue stream is often at a high pressure compared with atmospheric, such as 500 psig or 1,000 psig. In this case, it may be acceptable, and is attractive from the energy efficiency and cost points of view, to exploit the available high pressure by expanding this stream to a lower pressure, such as in a turboexpander, before using it as a heat-exchange medium for the feed stream. This provides additional cooling, and the turbo-expander may optionally also be used to at least partially recompress the permeate gas.

The process of the invention is useful for treating any gas stream that contains methane and nitrogen, either as a two-component mixture, or in admixture with other gases or vapors. The gas stream may contain methane and nitrogen in any proportions. The process can handle streams containing relatively small amounts of nitrogen, such as no more than about 10% nitrogen, or larger amounts, such as more than 10% nitrogen, more than 20% nitrogen or more than 30% nitrogen or higher. If the stream is natural gas, methane is usually, but not necessarily, the major component of the stream. Other representative streams that contain methane and nitrogen include streams from carbon dioxide miscible flooding of oil reservoirs for enhanced oil recovery (EOR), streams from nitrogen pressurization of underground oil/gas formations, landfill gas or biogas, and gas streams from petrochemical and other chemical processing. Depending on the source of the gas, other constituents besides methane and nitrogen may include other hydrocarbons, such as straight-chain and branched-chain saturated and unsaturated hydrocarbons and aromatic hydrocarbons, carbon dioxide, water vapor and hydrogen sulfide, for example.

One particular advantage of the present invention is the ability of the membranes to operate in the presence of water and hydrocarbons. Water is always present in raw natural gas streams to some extent, as vapor, entrained liquid, or both. The presence of this water has little or no adverse effects on the types of membranes used in the invention, but will simply permeate the membrane along with the methane. Likewise, propane, butane and higher hydrocarbons will pass into the permeate stream. Even if the membrane separation is performed at close to the dew point for these components, any condensation of liquid will not damage the membrane. In fact, as discussed in more detail in co-owned U.S. Pat. No. 5,688,307, entitled "Separation of Low-Boiling-Point Gases using Super-Glassy Membranes", incorporated herein by reference in its entirety, when super-glassy membranes are used, the presence of material in the feed stream that can condense within the membrane enhances the methane/nitrogen separation capability.

These capabilities are in sharp contrast to cryogenic methane/nitrogen separation. In cryogenic processes, water, carbon dioxide and hydrocarbons must be removed to a very low level, often much lower than gas pipeline specifications would otherwise demand, before cryogenic treatment to avoid such contaminants freezing and plugging the cryogenic section of the plant. A typical pretreatment train might include amine scrubbing to remove carbon dioxide, followed by glycol dehydration to remove most of the water vapor, then molecular sieves to remove any remaining water vapor and carbon dioxide, and a cooling/condensation step to remove heavy hydrocarbons and aromatics. For gas to be suitable for cryogenic processing, the carbon dioxide content should typically be no more than about 100 ppm, the water vapor content no more than about 1–2 ppm, and the hydrocarbon dewpoint below at least $-100°$ C. In contrast, natural gas pipeline specification for carbon dioxide is usually in the range 1–3%, for water vapor up to about 140 ppm, and for $C_{3+}$ hydrocarbons a dewpoint of $-20°$ C. This disparity creates a disincentive to use cryogenic techniques for methane/nitrogen separation in natural gas processing. The "overprocessing" needed to meet the cryogenic requirements can be costly, inconvenient and can lead to the creation of secondary streams and wastes for which there is no ready use or disposal method.

With the process of the invention, it is still required to treat the gas stream to the extent necessary to meet pipeline specification, if that is the destination of the gas. However, up to 2% is typically an acceptable carbon dioxide content for pipeline specification. This is very different from the ppm levels that may be needed before the gas can be cryogenically treated. Also, there is much greater flexibility in performing other treatments steps upstream or downstream in any convenient combinations. This is particularly advantageous if the stream to be treated contains significant amounts of nitrogen. If other treatments are performed downstream on the methane-enriched permeate or the nitrogen-enriched residue, the volume of gas to be treated at that point is significantly reduced and the capacity of other treatment units can be reduced accordingly.

The gas streams to which the invention is applied may be subjected to any known treatments upstream or downstream of the membrane process, for example to any or all of the feed, residue and permeate streams, for removing other constituents. The membrane separation may be augmented by other nitrogen/methane separation techniques. Such treatments and techniques include, but are not limited to, other membrane separations, condensation, absorption, adsorption and distillation, and may be applied to any or all of the feed, residue and permeate streams. Any appropriate equipment can be used for these supplementary separations, such as absorption units, including towers or columns containing liquid absorbents; adsorption units, including molecular sieves; condensation units, relying on chilling, compression or both to liquefy a portion of the gas stream; and membrane units, including those containing membranes selectively permeable to carbon dioxide or other constituents of the gas.

For example, in natural gas processing, lowering of the water and hydrocarbon dewpoints and removal of acid gases will usually be required. If $C_{3+}$ hydrocarbons are present, it may be possible, and is desirable, to utilize the cooling provided to the feed stream to recover a natural gas liquids (NGL) stream as an additional product. This can be done if the temperature required to achieve adequate methane/nitrogen selectivity and the hydrocarbon dewpoint of the raw feed gas are of the same order. Combinations of membrane separation and condensation that might be used to recover the heavier hydrocarbons as a liquid product are shown, for example, in U.S. Pat. No. 5,089,033; 5,199,962; 5,205,843; and 5,374,300.

Many ways to make use of the process of the invention as a stand-alone operation or to incorporate it into other separation and treatment schemes will suggest themselves to those of skill in the art based upon the teachings given herein. Without limiting the scope of the invention in any way, we believe that, as far as natural gas processing is concerned, it is useful to divide the gas streams that may be encountered for treatment into four categories:

1. Low flow rate (up to about 20 MMscfd) and low nitrogen content (up to about 10%)
2. Low flow rate (up to about 20 MMscfd) and high nitrogen content (more than 10%)
3. High flow rate (more than 20 MMscfd) and low nitrogen content (up to about 10%)
4. High flow rate (more than 20 MMscfd) and high nitrogen content (more than 10%)

1. Low flow rate/Low nitrogen content

Streams of this type require only a moderate reduction in nitrogen content to meet natural gas pipeline specification (usually no more than 4% nitrogen). A one-stage membrane unit, such as shown schematically in FIG. 1, operating as a stand-alone unit, will often be able to meet target specification for nitrogen, at the same time keeping methane loss in the residue stream to an acceptable level.

If the stream also contains propane, butane or heavier hydrocarbons, these may optionally be recovered in part as a liquid product stream from the cooled incoming feed stream.

The residue stream, enriched in nitrogen and typically now containing 30% nitrogen or above, may be used as fuel or subjected to further treatment, for example.

2. Low Flow Rate/High Nitrogen Content

Figure 2:
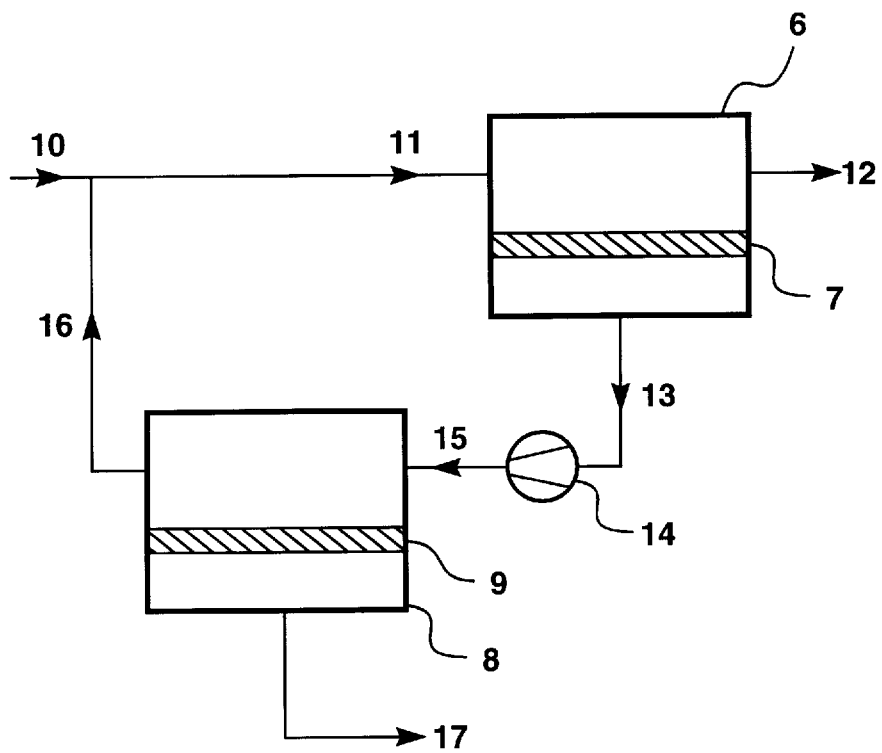
FIG. 2 is a schematic drawing illustrating the process of the invention as carried out using a two-stage membrane unit.

For feed streams with a high nitrogen content, a two-stage membrane system as shown in FIG. 2 is preferred over a one-stage membrane system to meet pipeline specification without excessive loss of methane. Referring now to FIG. 2, membrane units 6 and 8 contain membranes 7 and 9 that exhibit a methane/nitrogen mixed gas selectivity of at least about 4, more preferably at least about 5. Gas stream 10, containing at least methane and nitrogen, is mixed with recycle stream 16 to form feed stream 11, which passes across the feed side of membrane 7. Residue stream 12, enriched in nitrogen and depleted in methane compared with stream 11, is withdrawn from the feed side. First permeate stream 13, enriched in methane and depleted in nitrogen compared with stream 11, is withdrawn from the permeate side of membrane 7. Transmembrane permeation occurs because permeate stream 13 is at a lower pressure than feed stream 11. Stream 13 is compressed in compressor 14 to form feed stream 15 to the second membrane unit 8. Stream 15 passes across the feed side of membrane 9. Residue stream 16, enriched in nitrogen and depleted in methane compared with stream 15, is withdrawn from the feed side of membrane 9 and is recycled to join stream 10. Second permeate stream 17, further enriched in methane and depleted in nitrogen compared with stream 15, is withdrawn as the methane product stream from the permeate side of membrane 9.

In this case, the process comprises:

(a) providing a membrane having a feed side and a permeate side and being selective for methane over nitrogen;
(b) passing the gas stream to be treated across the feed side of the membrane at a temperature at which the membrane exhibits the target selectivity for methane over nitrogen;
(c) withdrawing from the feed side a residue stream depleted in methane and enriched in nitrogen compared with the raw gas stream;
(d) withdrawing from the permeate side a permeate stream enriched in methane and depleted in nitrogen compared with the raw gas stream;
(e) providing a second membrane having a second feed side and a second permeate side and being selective for methane over nitrogen;
(f) passing the permeate stream from the first stage across the second feed side of the second membrane;
(g) maintaining the second membrane at a temperature at which it exhibits the target selectivity for methane over nitrogen;
(h) withdrawing from the second feed side a second residue stream depleted in methane and enriched in nitrogen compared with the first permeate stream;
(i) withdrawing from the second permeate side a product stream enriched in methane and depleted in nitrogen compared with the first permeate stream.

Figure 3:
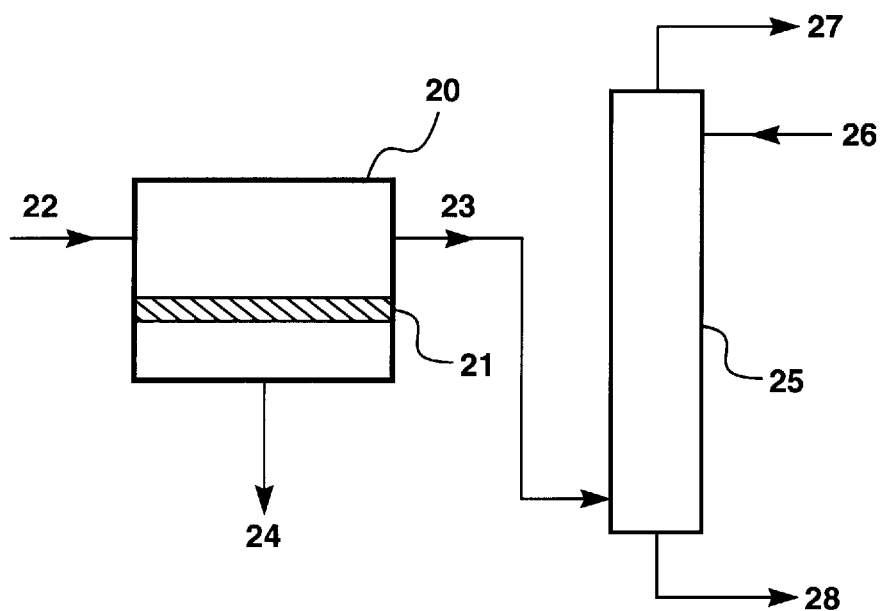
FIG. 3 is a schematic drawing illustrating the process of the invention as carried out by a combination of membrane separation and absorption.

Alternatively, a membrane separation step may advantageously be combined with an absorption step, as shown schematically in FIG. 3. Referring now to FIG. 3, membrane unit 20 contains a membrane 21 that exhibits a methane/nitrogen mixed gas selectivity of at least about 4, more preferably at least about 5. Gas stream 22, containing at least methane and nitrogen, passes across the feed side of membrane 21. Residue stream 23, enriched in nitrogen and depleted in methane compared with stream 22, is withdrawn from the feed side. Permeate stream 24, enriched in methane and depleted in nitrogen compared with stream 22, is withdrawn from the permeate side of membrane 21. Residue stream 23 passes to absorption unit 25 for further separation of nitrogen from methane. This stream is both cold and at pressure, which are favored conditions for the absorption process. Thus, the refrigeration used to cool the gas going to the membrane stage is used advantageously by the absorption stage, which also works more efficiently at low temperatures. Clean sorbent 26 enters the absorption unit, selectively absorbs methane and hydrocarbons compared with nitrogen, and leaves the unit as stream 28, which may be regenerated to recover the methane. Stream 27 is the nitrogen-enriched reject stream, which may typically contain over 90% nitrogen, such as 95% nitrogen or more, and may optionally be vented.

In this arrangement, the membrane separation serves as a pretreatment/bulk separation step. Depending on the exact composition of the stream to be treated, the membrane step can often be configured to reduce the volume of the feed gas by, for example, 50% by preferentially permeating methane. The nitrogen-rich residue stream then has a high nitrogen content, typically 40% nitrogen or more, and a much smaller volume than the feed stream. This reduces the load on the absorption unit and facilitates efficient separation.

Streams of this type can also be treated by combining membrane separation with pressure-swing adsorption (PSA), for example.

3. High Flow Rate/Low Nitrogen Content

Figure 4:
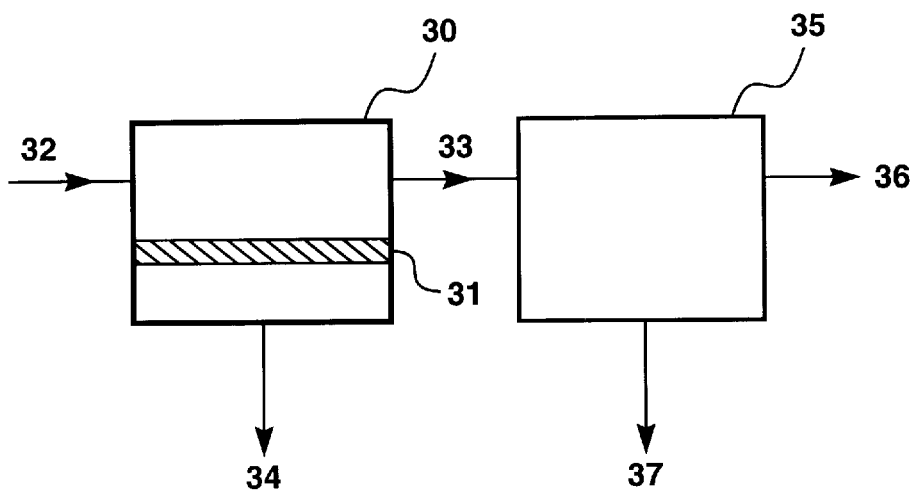
FIG. 4 is a schematic drawing illustrating the process of the invention as carried out by a combination of membrane separation and adsorption.

For streams of this type, our calculations suggest that, as above, a preferred treatment option is single-stage membrane separation followed by absorption or adsorption to increase methane recovery. FIG. 4 shows such a treatment process schematically. Referring now to FIG. 4, membrane unit 30 contains a membrane 31 that exhibits a methane/nitrogen mixed gas selectivity of at least about 4, more preferably at least about 5. Gas stream 32, containing at least methane and nitrogen, passes across the feed side of membrane 31. Residue stream 33, enriched in nitrogen and depleted in methane compared with stream 32, is withdrawn from the feed side. Permeate stream 34, enriched in methane and depleted in nitrogen compared with stream 32, is withdrawn from the permeate side of membrane 31. Residue stream 33 passes to adsorption unit 35 for further separation of nitrogen from methane. Methane and hydrocarbons are selectively sorbed. Stream 36 is the nitrogen-enriched reject stream, which may typically contain over 90% nitrogen, such as 95% nitrogen or more, and may optionally be vented. Stream 37 is the methane-enriched stream recovered from the adsorption unit when the sorbent is regenerated.

Any type of adsorption may be combined with membrane separation in the processes of the invention. A typical, convenient combination is membrane separation with pressure swing adsorption. Also typically, multiple sorbent beds are used, so that one or more is in active use, while one or more is being regenerated.

This hybrid scheme has significant advantages over either of the unit separation processes alone. The membrane step separates the bulk of the methane from the natural gas. The residue gas passed from the membrane system to the adsorption unit has a smaller volume and is enriched in nitrogen. It contains little or none of the other contaminants present in natural gas, namely, carbon dioxide, hydrogen sulfide, higher hydrocarbons, water vapor, etc. because these permeate the membrane with the methane stream. This enables the adsorption process to work at maximum efficiency. The gas is also at pressure, which is required by the adsorption system. The adsorption process selectively adsorbs additional methane in the natural gas, and rejects an essentially hydrocarbon-free nitrogen stream.

If lower levels of methane recovery are acceptable, a two-stage membrane system as shown in FIG. 2 may be used as an alternative to a hybrid treatment process.

4. High Flow Rate/High Nitrogen Content

A stand-alone membrane treatment has difficulty providing adequate methane recovery for large streams of high nitrogen content, so is a less preferred choice for methane/nitrogen separation. Combinations of membrane separation with absorption or adsorption as above are possible, but are also not preferred, because the non-membrane units are operating outside their most efficient ranges.

Figure 5:
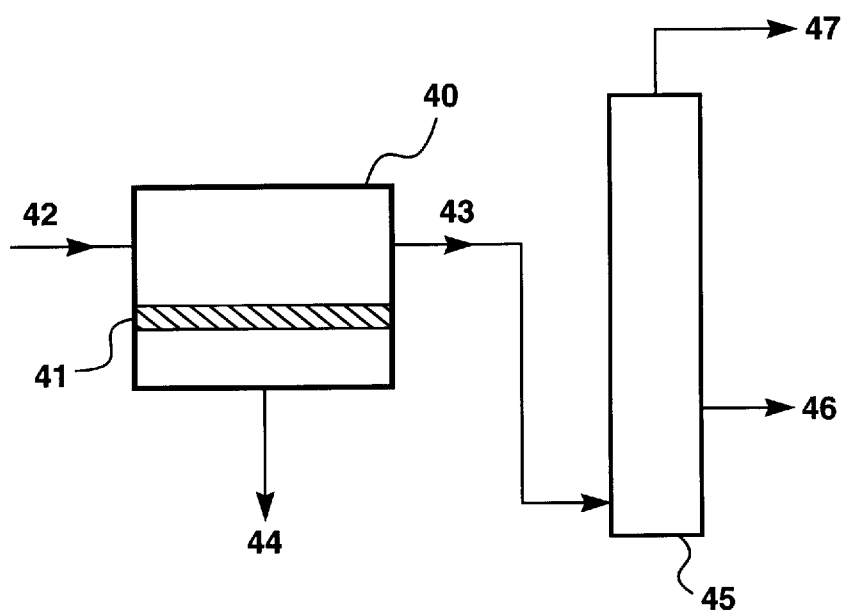
FIG. 5 is a schematic drawing illustrating the process of the invention as carried out by a combination of membrane separation and cryogenic separation.

For these reasons, we prefer combinations of membrane separation with cryogenic methane/nitrogen separation for these streams. FIG. 5 shows such a treatment combination schematically. Referring now to FIG. 5, membrane unit 40 contains a membrane 41 that exhibits a methane/nitrogen mixed gas selectivity of at least about 4, more preferably at least about 5. Gas stream 42, containing at least methane and nitrogen, passes across the feed side of membrane 41. Residue stream 43, enriched in nitrogen and depleted in methane compared with stream 42, is withdrawn from the feed side. Permeate stream 44, enriched in methane and depleted in nitrogen compared with stream 42, is withdrawn from the permeate side of membrane 41. Residue stream 43 passes to cryogenic unit 45 for further separation of nitrogen from methane. Stream 46 is the methane product stream. Stream 47 is the nitrogen reject stream.

For natural gas treatment applications, the membrane unit both performs a partial separation of nitrogen from the gas and also removes water, heavy hydrocarbons, carbon dioxide and hydrogen sulfide. The remaining methane/nitrogen separation is performed by the cryogenic plant.

The process outlined in FIG. 5 has significant advantages over the cryogenic process alone. The membrane system reduces the flow of gas to the cryogenic plant, and hence the needed cryogenic capacity, substantially. Also the membrane system simplifies, or in some case replaces, the complicated pretreatment train required to remove all condensable components. These issues are discussed in more detail in co-owned U.S. Pat. No. 5,647,227, entitled "Membrane-Augmented Cryogenic Methane/Nitrogen Separation", which is incorporated herein by reference in its entirety.

Another aspect in which the invention is expected to be particularly useful is in cogeneration, that is generation of electric power on-site at, or close to, the gas field. Advances in gas turbine technology, such as in combined cycle processes, are beginning to make such electric power generation possible. Consequently, under some conditions, the economics of using the gas directly to make electricity are more attractive than piping the gas itself to distant locations. Not only is electric power useful to a wider base of industries than natural gas, but the costs of electricity transmission across long distances are usually significantly lower than the corresponding gas transport costs.

A feature of the new generation of turbines is that they can deliver electricity at high efficiency, while utilizing relatively lean fuel gas mixtures. Thus, the fuel gas does not have to be of pipeline quality composition, such as in regard to water content, hydrocarbon dewpoint and so on. Nevertheless, some upgrading of the Btu value of nitrogen-laden gas will normally be necessary, and the process of the invention is very well suited to accomplish this task. A particular advantage of using our membrane-based process to remove nitrogen from the raw gas is that, in many embodiments, essentially all of the raw gas from the well can be used. As just one example, suppose the raw gas contains a relatively high content of both nitrogen and $C_{3+}$ hydrocarbons. A condensation step can be used in front of the membrane separation step to recover NGL. The membrane step can then be used to treat the remaining gas to create a low-pressure permeate stream, enriched in methane and remaining heavier hydrocarbons and depleted in nitrogen, and thus having an upgraded Btu value compared with the membrane feed gas. This gas can still contain as much as 8%, 10% or more nitrogen and still be acceptable as fuel gas for the turbine. As a result, the demands on the separation capabilities of the membrane system are less than in the case when the target is pipeline-grade gas. This means that raw gas with a nitrogen content that would be unacceptably high for a pipeline-grade product can be usefully exploited. Furthermore, the feed gas to the combustor for the power-generating turbine also has to be at low pressure, for example 150 psia, so no recompression of the membrane permeate stream is required.

The residue stream from the membrane unit consists of a nitrogen-enriched, Btu-value-reduced stream at high pressure. Value can be extracted from this stream by expanding and cooling. For example, the stream can be fed to an expander connected to a motor, so that the expander drives the motor, generating additional power. This power can optionally be fed to the power grid, thereby supplementing the power from the primary turbine fueled by the permeate gas. Also, as discussed above, since the expanded gas is now at a substantially lower temperature, it can be used to cool the raw gas stream for condensing the NGL fraction.

In comparison with other techniques to upgrade natural gas for cogeneration purposes, the above-described scheme is expected to offer a simple and cost-effective alternative.

The invention has been described in detail as it pertains to the separation of nitrogen and methane. It will be apparent to those of skill in the art that the separation of ethylene from nitrogen presents similar difficulties. Ethylene also has a small molecular diameter, a low boiling point and only moderately better solubility in polymer materials than nitrogen. Therefore, the separation of this gas pair suffers, like methane/nitrogen separation, from a lack of membrane materials with good enough discrimination ability for a practical process. For example, silicone rubber membranes exhibit a mixed gas ethylene/nitrogen selectivity of about 5 at room temperature. Although much better than the room temperature methane/nitrogen selectivity, this is still too low to make membrane-based ethylene/nitrogen separation very attractive. A selectivity of 10 or 15 would improve separation performance and economics substantially. Such a selectivity can be achieved by following the teachings of the invention as for methane/nitrogen separation with regard to the membrane materials used and the operating temperature.

A particularly useful application of our process in this regard is the treatment of purge gas streams from polyethylene manufacturing plants. In the production of polyethylene, nitrogen is often used to purge residual ethylene from the polymer product. This results in a waste stream containing ethylene and nitrogen. The process of the invention can be used to separate the monomer from the nitrogen purge gas. In some cases, this enables the nitrogen and/or ethylene to be recovered for reuse.

The process of the invention may also be represented in this aspect by the schematic drawing of FIG. 1. In the case of ethylene/nitrogen separation, membrane unit 1 contains a membrane 2 that exhibits an ethylene/nitrogen mixed gas selectivity of at least about 10, and more preferably at least about 15 under the operating conditions of the process. Feed stream 3, containing at least ethylene and nitrogen, passes across the feed side of the membrane. Residue stream 4, enriched in nitrogen and depleted in ethylene compared with stream 3, is withdrawn from the feed side. Permeate stream 5, enriched in ethylene and depleted in nitrogen compared with stream 3, is withdrawn from the permeate side.

The invention is now further illustrated by the following examples, which are intended to be illustrative of the best mode of carrying out the invention, but are not intended to limit the scope or underlying principles of the invention in any way.

EXAMPLES

Example 1

Preparation of Silicone Rubber Membrane

A microporous support membrane was dip-coated in a 6% dimethyl siloxane solution at 1 ft/min coating speed, then dried in an oven at 60° C. to crosslink the membrane. The resulting membranes had a nominal selective layer thickness of 20 µm. Samples of the finished composite membrane were cut into 12.6 cm² stamps and tested in a permeation test-cell apparatus with pure oxygen and pure nitrogen at 23° C. feed temperature and 50 psig feed pressure. The gas fluxes of the membranes were measured, and the oxygen/nitrogen selectivities were calculated. Any membrane with a selectivity less than the intrinsic selectivity of the material was considered defective.

Example 2

Preparation of Pebax 2533 Membrane

Membranes were prepared as in Example 1, using a 5% Pebax 2533 polymer solution. The resulting membranes had a nominal selective layer thickness of 6 µm. Fluxes and selectivities of the finished membranes were calculated to test for integrity as in Example 1.

Example 3

Preparation of PTMSP Membrane

Films of PTMSP were prepared by hand-casting. A 2-wt % polymer solution in toluene was cast onto clean glass plates with a casting bar. After evaporation of the solvent, the films were removed from the glass plate by immersion in water and were dried in a vacuum oven at 80° C. The nominal thickness of the films was about 30 µm. Fluxes and selectivities of the finished films were calculated to test for integrity as in Example 1.

Example 4

Effect of Feed Temperature on Silicone Rubber Membrane

Figure 6:
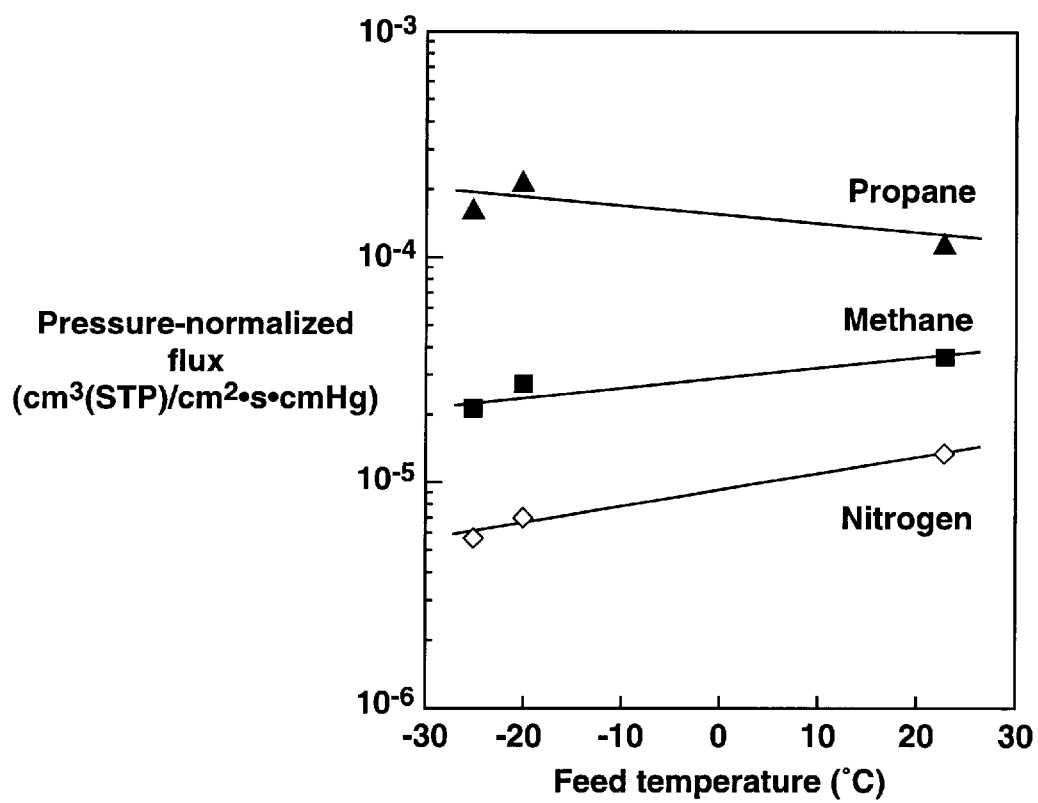
FIG. 6 is a graph of pressure-normalized flux as a function of feed temperature for permeation of propane, methane and nitrogen through a silicone rubber membrane.
Figure 7:
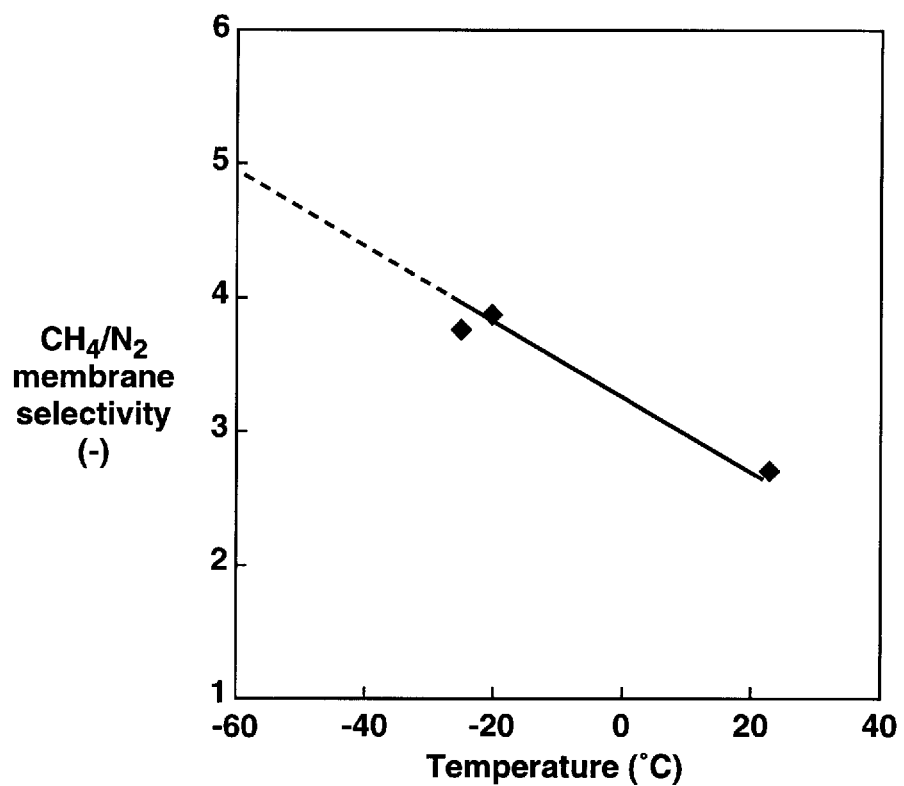
FIG. 7 is a graph of methane/nitrogen selectivity as a function of feed temperature for a silicone rubber membrane.

An experiment was carried out to determine the performance of a silicone rubber membrane at different temperatures. Membranes were prepared as in Example 1. The silicone rubber composite membrane was cut into 12.6-cm² stamps, and subjected to permeation tests following the general procedure as described in Example 1, using a model natural gas mixture containing 87% methane, 10% nitrogen, and 3% propane at three feed temperatures, −26° C., −10° C., and 23° C. The low temperatures were obtained by immersing the test cell in a low-temperature recirculating chiller. Measurements were made at a feed pressure of 200 psia. The permeate side was maintained at atmospheric pressure. During each test, the feed, permeate, and residue compositions were analyzed by gas chromatography (GC). The pressure-normalized fluxes of propane, methane, and nitrogen, and the propane/nitrogen, propane/methane, and methane/nitrogen selectivities were calculated using an in-house computer program. Flux and selectivity results are shown in FIGS. 6 and 7.

The pressure-normalized fluxes of nitrogen and methane both decrease with decreasing temperature, because of a decrease in diffusion coefficient that exceeds the gain in solubility coefficient. For propane, a condensable gas, the increase in solubility is larger than the decrease in diffusion coefficient, resulting in a net increase in the pressure-normalized flux at lower temperatures.

The methane/nitrogen selectivity increased with decreasing temperature, from about 2.7 at 23° C., to about 4 at sub-ambient temperatures. As can be seen from FIG. 7, a selectivity of about 5 can be obtained at an operating temperature of about −60° C. This temperature is sufficiently above the glass-transition temperature of silicone rubber (−123° C.) that the selectivity is still increasing as temperature falls.

Example 5

Effect of Temperature on Pebax Membrane

Figure 8:
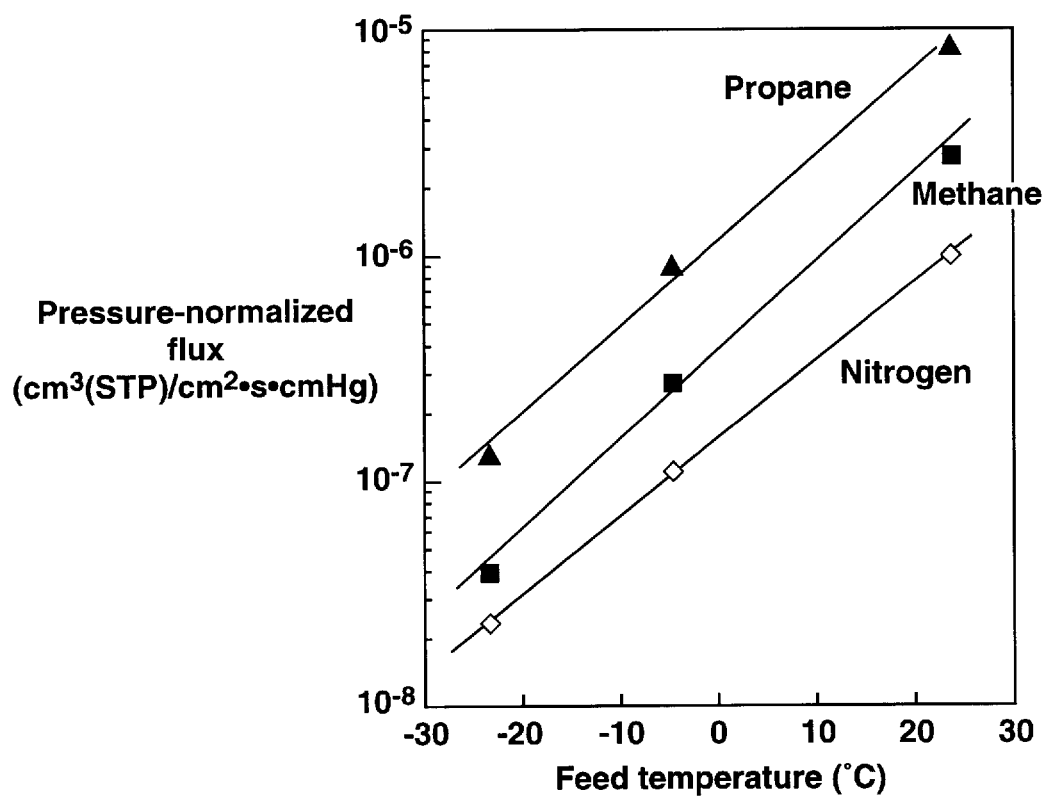
FIG. 8 is a graph of pressure-normalized flux as a function of feed temperature for permeation of propane, methane and nitrogen through a Pebax 2533 membrane.
Figure 9:
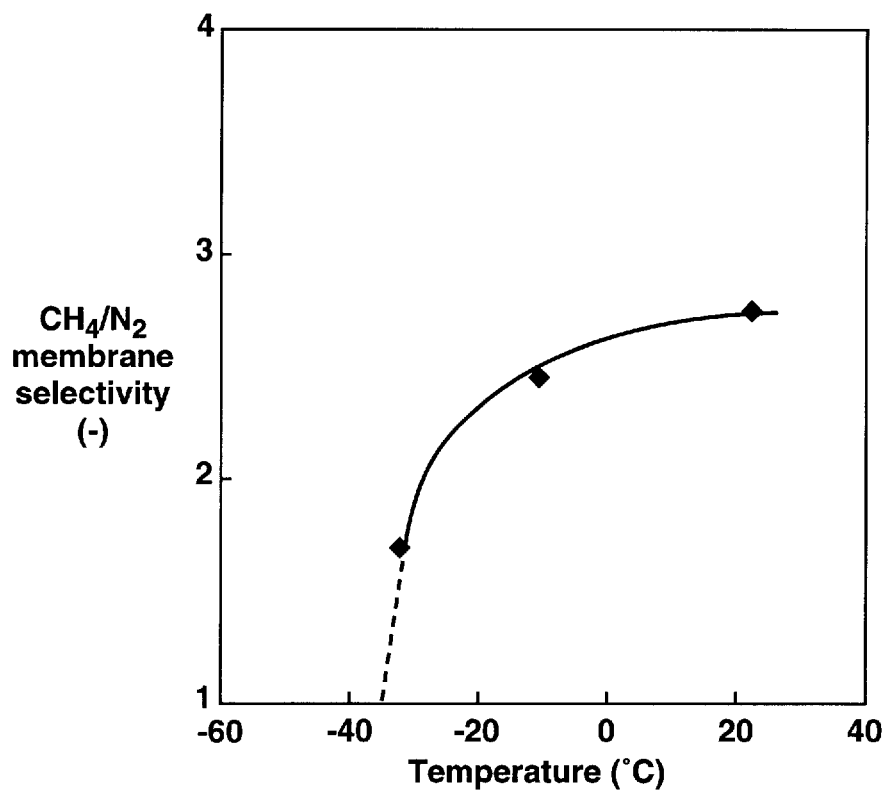
FIG. 9 is a graph of methane/nitrogen selectivity as a function of feed temperature for a Pebax 2533 membrane.

An experiment was carried out to determine the performance of a Pebax membrane at different temperatures. Pebax is a polyamide-polyether block copolymer that is rubbery at room temperature and that we believed to have a glass-transition temperature below −50° C. From earlier experiments, we knew that this material has a methane/nitrogen selectivity in the range 2–4 at room temperatures. Pebax membranes were prepared as in Example 2, and were subjected to mixed-gas permeation tests as in Example 4. The pressure-normalized fluxes of propane, methane, and nitrogen, and the propane/nitrogen, propane/methane, and methane/nitrogen selectivities, were calculated using an in-house computer program. Flux and selectivity results are shown in FIGS. 8 and 9.

To our surprise, the pressure-normalized fluxes of all three components decrease with decreasing temperature, and the loss of methane permeability was more severe than the loss of nitrogen permeability. As a result, the methane/nitrogen selectivity decreased from close to 3 at room temperature to only about 1.8, and falling, at −30° C. This decrease must be due to the membrane becoming more glassy in character as the temperature falls. It appears that the glass-transition temperature of this polymer is probably around −40° C. or −50° C., and that even 30° C. or 40° C. above the transition, the "glassy", diffusion-controlled effects are beginning to dominate the solubility effects. This polymer is, therefore, not suitable for use in methane/nitrogen separation as described here and is outside the scope of the invention.

Example 6

Effect of Feed Temperature on PTMSP Films

Figure 10:
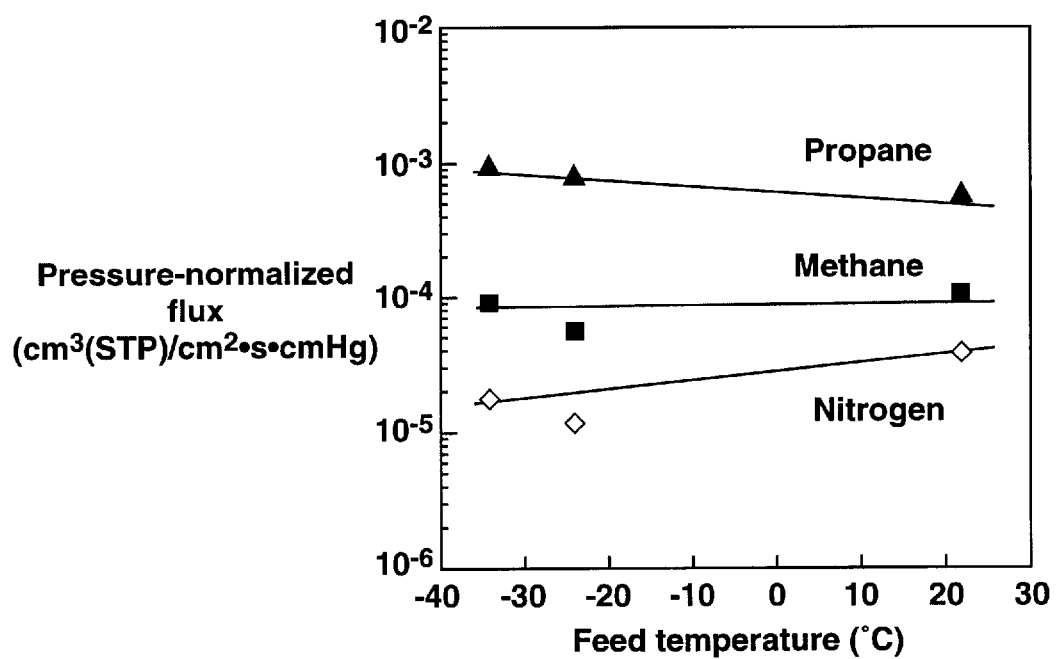
FIG. 10 is a graph of pressure-normalized flux as a function of feed temperature for permeation of propane, methane and nitrogen through a PTMSP membrane.
Figure 11:
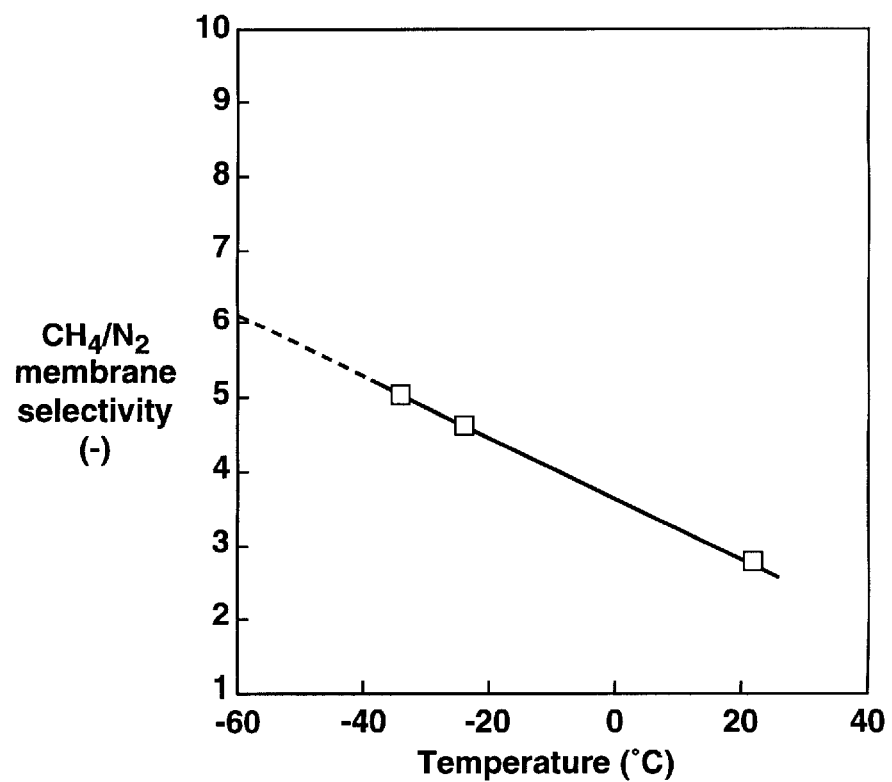
FIG. 11 is a graph of methane/nitrogen selectivity as a function of feed temperature for a PTMSP membrane.

An experiment was carried out to determine the performance of a PTMSP film at different temperatures. PTMSP films were prepared as in Example 3, and were subjected to mixed-gas permeation tests as in Example 4. These films were tested at temperatures of 23° C., −26° C. and −34° C. The pressure-normalized fluxes of propane, methane, and nitrogen, and the propane/nitrogen, propane/methane, and methane/nitrogen selectivities were calculated using an in-house computer program. Flux and selectivity results are shown in FIGS. 10 and 11.

The pressure-normalized flux of propane increases as the temperature falls. Propane is condensable and sorba strongly into the free-volume of PTMSP, especially at lower temperatures. The methane flux remains fairly constant at about $1 \times 10^{-4}$ cm$^3$(STP)/cm$^2$·s·cmHg over the temperature range. The nitrogen flux fails from about $4 \times 10^{-5}$ cm$^3$(STP)/cm$^2$·s·cmHg to about $1.8 \times 10^{-5}$ cm$^3$(STP)/cm$^2$·s·cmHg, resulting in a rise in selectivity from 2.8 at 23° C. to about 5 at −34° C. As can be seen from FIG. 11, lower temperatures would result in higher selectivities of 6 or more.

Example 7 Ethylene/nitrogen separation

A length of silicone rubber membrane was prepared as in Example 1 and rolled into a spiral-wound membrane module. The module was used to evaluate separation of ethylene from nitrogen in a polymer manufacturing plant at various feed gas flow rates. The feed stream contained 30 vol % ethylene. The experiments were conducted with a feed pressure of 260 psig and a permeate pressure of 8 psig. All experiments were performed at a temperature of −40° C. The results are given in Table 2.

TABLE 2

| Feed flow rate (scfm) | Residue ethylene conc. (vol %) | Permeate ethylene conc. (vol %) | Selectivity ethylene/ nitrogen | Ethylene removal (%) |
|---|---|---|---|---|
| 21 | 12.3 | 44.1 | 7 | 79 |
| 24 | 13.6 | 44.5 | 7 | 75 |
| 27 | 14.7 | 46.1 | 8 | 72 |
| 29 | 15.2 | 48.0 | 9 | 70 |
| 31 | 16.7 | 58.9 | 12 | 67 |

As can be seen, the ethylene selectivity varied from 7 to 12, depending on the feed flow rate. These selectivities are low compared with what would be expected from this membrane at this temperature. The low selectivity, combined with the dependence on flow rate, indicates that concentration polarization was occurring in the module. Concentration polarization can be reduced by increasing the flow rate, thereby providing greater turbulence and better mixing on the feed side. Based on other studies of concentration polarization, we believe the selectivity was depressed by about 50% or more for the lower feed flow rates and was still somewhat depressed at the higher feed flow rates. On this basis, the ethylene/nitrogen selectivity of the membrane at −40° C. is at least 10 or 12, and is more probably about 15.

We claim:

1. A process for treating a gas stream comprising ethylene and nitrogen, said process comprising the following steps:
   (a) providing a membrane having a feed side and a permeate side, being selective for ethylene over nitrogen and comprising a polymer selected from the group consisting of (I) rubbery polymers having a glass transition temperature at least about 30° C. below the temperature of step (b) and (II) polymers characterized by
      (i) a glass transition temperature of at least about 100° C.;
      (ii) a free volume of at least about 10%: and
      (iii) an ethylene permeability at room temperature of at least about 1,000 Barrer;
   (b) passing said gas stream across the feed side of said membrane at a temperature at which the membrane exhibits a selectivity for ethylene over nitrogen of at least about 8;

(c) withdrawing from said feed side a residue stream depleted in ethylene and enriched in nitrogen compared with said gas stream;

(d) withdrawing from said permeate side a permeate stream enriched in ethylene and depleted in nitrogen compared with said gas stream.

2. The process of claim 1, wherein said temperature is in the range 0° C. to −100° C.

3. The process of claim 1, wherein said temperature is in the range −20° C. to −70° C.

4. The process of claim 1, wherein said temperature is no lower than about −60° C.

5. The process of claim 1, wherein said temperature is no lower than about −50° C.

6. The process of claim 1, wherein said temperature is no lower than about −40° C.

7. The process of claim 1, wherein said polymer is rubbery and said glass transition temperature is below about −50° C.

8. The process of claim 1, wherein said polymer is rubbery and said glass transition temperature is below about −80° C.

9. The process of claim 1, wherein said polymer is rubbery and said glass transition temperature is below about −100° C.

10. The process of claim 1, wherein said rubbery polymers comprise a siloxane polymer comprising repeating units having the structure:

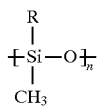

wherein R is an alkyl group having one to eight carbon atoms and n is a positive integer.

11. The process of claim 1, wherein said rubbery polymers comprise silicone rubber.

12. The process of claim 1, wherein said polymers characterized by (i) a glass transition temperature of at least about 100° C.;

(ii) a free volume of at least about 10%; and (iii) an ethylene permeability at room temperature of at least about 1,000 Barrer; comprise a substituted polyacetylene.

13. The process of claim 1, wherein said polymers characterized by (i) a glass transition temperature of at least about 100° C.;

(ii) a free volume of at least about 10%; and (iii) an ethylene permeability at room temperature of at least about 1,000 Barrer; comprise polytrimethylsilylpropyne.

14. The process of claim 1, wherein said selectivity is at least about 10.

15. The process of claim 1, wherein said selectivity is at least about 12.

16. The process of claim 1, wherein said membrane exhibits a transmembrane ethylene pressure-normalized flux of at least about $1 \times 10^{-5}$ cm$^3$(STP)/cm$^2 \cdot$s$\cdot$cmHg.

17. The process of claim 1, wherein said membrane exhibits a transmembrane ethylene pressure-normalized flux of at least about $1 \times 10^{-4}$ cm$^3$(STP)/cm$^2 \cdot$s$\cdot$cmHg.

18. A process for treating a gas stream comprising ethylene and nitrogen, said process comprising the following steps:

(a) providing a membrane having a feed side and a permeate side, being selective for ethylene over nitrogen, and having nitrogen permeability at room temperature of at least about 91 Barrer;

(b) passing said gas stream across the feed side of said membrane at a temperature at which the membrane exhibits a selectivity for ethylene over nitrogen of at least about 8;

(c) withdrawing from said feed side a residue stream depleted in ethylene and enriched in nitrogen compared with said gas stream;

(d) withdrawing from said permeate side a permeate stream enriched in ethylene and depleted in nitrogen compared with said gas stream.

* * * * *